Patented Oct. 14, 1952

2,614,096

UNITED STATES PATENT OFFICE 2,614,096

CONDENSATION PRODUCTS OF PHENOL, FORMALDEHYDE, AND UNSUBSTITUTED MONONUCLEAR DIHYDRIC PHENOLS

Raymond J. Spahr, Cranbury, N. J., assignor to The Borden Company, New York, N. Y., a corporation of New Jersey No Drawing. Application June 16, 1949, Serial No. 99,582

11 Claims. (Cl. 260—54)

This application is a continuation in part of the application, Serial No. 512,346, filed November 30, 1943.

This invention relates to stable aqueous solutions of phenolic resinous condensation products, and more particularly to products and the preparation thereof made by reaction of a phenol, formaldehyde and a suitable unsubstituted dihydric phenol, which products are suitable for use as glues, binding agents, for casting into insoluble infusible masses, and the like.

The phenolic adhesives or glues have certain well recognized advantages over other glues, particularly in the making of plywood and in similar industries, in that the glue bond after it is cured is highly resistant to weathering and is insoluble even in boiling water. In this respect the phenolic resin glues are distinctly superior to glues of the urea-formaldehyde type.

The phenolic resin glues, however, heretofore employed have required the use of a strongly acid hardening agent to effect curing, or have been used in a highly alkaline condition with the curing accomplished by application of heat and pressure. The acid glues have a strong disintegrating effect upon wood fibers and consequently, such strongly acidic glues are not satisfactory for many purposes. The alkaline phenolic resin glues heretofore used have not been capable of being cured by the so-called "cold pressing" method which involves curing for a number of hours at 70–75° F.

Accordingly, an object of this invention is the provision of stable substantially neutral resinous adhesive products prepared by reaction of a phenol with formaldehyde and a dihydric phenol.

Another object of the invention is the provision of aqueous solutions of such resins which are stable upon the addition of certain acids and which may be converted thereby into insoluble infusible masses at 70–75° F., or at higher temperatures.

A further object of the invention is the preparation of solutions of such resins that are substantially neutral and that can be cured by the addition of such materials as formaldehyde, paraformaldehyde or hexamethylenetetramine.

Another object of this invention is the provision of aqueous solutions of such resinous products characterized by excellent stability on storing at room temperatures, which do not separate from solution on aging, and which can be diluted with large volumes of water without precipitating the resin.

According to this invention the products are preferably formed by condensing phenol with an aqueous solution of formaldehyde and an amount of alkali just sufficient to act as a catalyst until a low condensed polymer of the phenol and formaldehyde is formed. The condensation is conducted by refluxing the mixture of phenol and formaldehyde until the low condensed polymer is formed. This solution is then cooled to below about 70° C. and a suitable quantity of an unsubstituted dihydric phenol is dissolved in this solution. Resorcinol, catechol and hydroquinone are examples of suitable dihydric phenols for this purpose. The solution containing the added dihydric phenol is then further condensed by heating, desirably at a temperature not exceeding 100° C., and preferably at a temperature between 80 and 85° C., until the condensation product possesses a viscosity of from 0.5 poise to 1.65 poises at a solids content between 50 and 60% as determined by the standard A. S. T. M. method for solids determination. This A. S. T. M. solids determination is conducted by placing a gram and a half sample in a 2½ inch cup and heating to a temperature of 135° C. for three hours. The residue is weighed and the solids calculated from the initial and final weighings. Should the reaction product of the low condensed polymer and dihydric phenol have a solids content without the range of 50 to 60%, the sample for viscosity determination is adjusted to a solids content within the range of 50 to 60% prior to the determination of the viscosity.

At this stage, the resulting reaction product may then be vacuum distilled until it reaches a suitable viscosity, such as 120–135 at 70° F. in a Stormer viscometer using a 500 gram weight, and the material is then cooled to room temperature. For certain types of adhesive compositions, the viscosity may be between 20 and 200 at 70° F. in a Stormer viscometer using a 500 gram weight. The final product is not a highly condensed material but preferably has a solids content of at least about 50%, and a pH in the neighborhood of 6 to 8.5.

The formaldehyde which is reacted with the phenol is an aqueous solution containing 30 to 60% formaldehyde by weight. The commercial formaldehyde, sold under the name "Formaldehyde Solution," "Formalin" or "Formol" and containing about 37% by weight of formaldehyde gas and water with about 1 to 15% methanol added to prevent polymerization, has been found very satisfactory for this purpose. Alternatively, there may be used paraformaldehyde dissolved in water or in a water-alcohol mixture to obtain a concentration of 40 to 60% formaldehyde by weight, or again, paraformaldehyde may be added to 37% formaldehyde to obtain the desired concentration. Such aqueous solutions of formaldehyde may also contain methanol in an amount of about 1 to 15%.

Instead of adding all of the resorcinol or other dihydric phenol after the preliminary condensation of the monohydric phenol and formaldehyde, a small proportion of the dihydric phenol—not more than 10 parts for each 100 parts of phenol used in the formula—may be added to the original mixture of phenol and formaldehyde before they are condensed. When more than about 10 parts of a dihydric phenol such as resorcinol is added to the initial ingredients in the presence of only sufficient alkali to act as a catalyst, the mixture will gel shortly after heat is applied to it. Accordingly, since only a very small proportion of the resorcinol can be added successfully at the beginning of the reaction, it is usually more advantageous in commercial operations to add all of the resorcinol after the preliminary condensation of the phenol and formaldehyde has been effected.

The proportions of monohydric phenol and formaldehyde that are reacted together before addition of the main portion of the dihydric phenol are preferably adjusted to produce a reaction product that contains not more than about 2% of free formaldehyde and preferably less than 0.75% free formaldehyde at the time that dihydric phenol is added. It is not essential that this initial condensation product contain any free formaldehyde but if the proportion of formaldehyde in the initial composition is too low, an excessive amount of formaldehyde, paraformaldehyde or hexamethylenetetramine will have to be added to effect curing of the finished product. The proportion of formaldehyde that can be used with the monohydric phenol will vary depending upon the amount of resorcinol that is to be added subsequently. When the proportion of resorcinol used is very high, as much as 2.5 mols of formaldehyde may be used for each mol of monohydric phenol. It is preferable, however, to use a smaller proportion of formaldehyde, although if less than 1.3 mols of formaldehyde is used for each mol of phenol, the amount of curing agent that has to be added to the final product tends to become excessive.

For practical purposes, I prefer to use from about 1.5 to about 2 mols of formaldehyde for each mol of monohydric phenol. Within this range, the amount of dihydric phenol added can all be utilized to advantage, and the quantity of curing agent added to the finished product does not have to be excessive. Also, the final product is stable, has a long storage life and a long working life after addition of the curing agent and spreading of the glue.

The degree to which the original phenol and formaldehyde are condensed before addition of the resorcinol may be varied somewhat but these initial reactants are preferably condensed long enough to form phenol-alcohols and polymerize these condensation products to some extent. One convenient way of determining the proper amount of condensation to be applied to the initial mixture of phenol and formaldehyde is to determine either the free formaldehyde content of the mixture, or its water tolerance, or both. These original materials should be sufficiently reacted to lower the free formaldehyde content below about 2%, and the reaction product should also be condensed until it will tolerate the addition of from about 0.1 to 5 volumes of water without causing the resin solution to become cloudy at 70° F.

In the preparation of these products, the cresols and xylenols cannot be substituted entirely for the phenol used in making up the initial reaction product, although a small proportion of one of these monohydric phenols may be substituted for say about 10% of the phenol originally employed.

If any appreciable amount of free formaldehyde is present in the preliminary phenol-formaldehyde condensation product, this material should be cooled before the resorcinol is added to avoid the possibility of gelling the entire product upon the addition of the resorcinol.

Various alkaline catalysts may be employed in preparing the initial condensation product of phenol and formaldehyde, although the alkali used should be of non-volatile character such as caustic soda, caustic potash, sodium carbonate, trisodium phosphate, etc. The use of a volatile alkali such as ammonium hydroxide is apt to cause separation of the resin from solution in the preparation of the initial phenol-formaldehyde reaction product. The amount of the alkaline catalyst should be sufficient to produce a pH of at least 7.5 and preferably a pH of around 8.0 to 8.5 or slightly higher. If too much alkali is added, the excess has a tendency to keep the initial reaction products of the phenol-formaldehyde in solution. If the water tolerance test is used to determine the end point of the preliminary reaction, this makes it difficult to determine when these initial reactants have been condensed sufficiently for the addition of the resorcinol. For this reason, it is desirable to adjust the pH of the initial phenol and formaldehyde mixture within the range of about 7.5 to 8.8, although this range is not critical if the reaction end point is determined by the free formaldehyde test.

There is little advantage in employing more than about 150 parts by weight of resorcinol for each 100 parts of phenol in the product. Preferably, not more than 100 parts by weight of resorcinol for each 100 parts of phenol in the product is used. However, if the final product is to be cured at elevated temperatures of the order of 300° F., it is desirable to use at least 10 parts of resorcinol for each 100 parts of phenol, and if the product is to be cured at low temperatures, for example, cold press temperatures of the order of 70° F., it is necessary to employ at least about 75 parts of resorcinol for each 100 parts of phenol in order to obtain a satisfactory final product.

When the dihydric phenol such as resorcinol is added to the initial condensation product of phenol and formaldehyde, it is desirable to add additional alkali, particularly if the final product is to be cured by the addition of formaldehyde, paraformaldehyde or hexamethylenetetramine.

The adjustment of the pH at this stage in the process is simply to allow for a drop in pH during the further condensation of the product and if the final product is to have a pH of 6.0 to 7, the addition of alkali along with the dihydric phenol is unnecessary. On the other hand, if the final product is desired with a pH above 7, additional alkali should be added along with the resorcinol. Any of the alkalis mentioned above may be used for this purpose and also alkalis such as ammonia may be employed. Volatile alakalis such as ammonium hydroxide, however, produce a stronger reaction and it is desirable when they are used to complete the condensation at somewhat lower temperatures in order to control the properties of the final product.

For the preparation of a glue to be cured by an addition of formaldehyde or a formaldehyde-liberating agent, it is desirable to have the pH of the phenol-formaldehyde condensation product mixed with resorcinol adjusted to the range of about 7 to 9 or 8 to 9 before the condensation of the product is completed.

The degree of condensation of the material after addition of resorcinol or other dihydric phenol is determined to a large extent by the ultimate use of the product. If the final product is to have a very high solids content, the condensation after addition of resorcinol may be stopped after the product has a viscosity of 0.5 poise at a solids content of 40 to 60%. Such a product would be very watery and in order to reduce this product to a material of suitable viscosity, large proportions of water would have to be distilled off under vacuum.

If the final product is to be used as a glue, it is of course desirable to carry the second condensation of the material further so that the final glue after distillation of water will have a solids content in the neighborhood of 50 to 70% solids.

If the final condensation of the product is carried too far, however, its storage life is reduced, and for this reason it is preferred not to carry this final condensation beyond the point of having a viscosity of 1.65 poises at a solids content of 40 to 60%.

After the final condensation of the product is completed, the amount of water that will have to be distilled off will depend of course upon the degree of the final condensation and the viscosity desired in the final product. When the material is to be used as a glue in a roller coater operation in the manufacture of plywood, it is usually desirable to obtain a final product with a viscosity of 120–135 at 70° F. on the Stormer viscometer, using a 500 gram weight, although obviously the final product, particularly for other types of glue, may have a viscosity outside of these limits, such as 20 to 200 at 70° F. on the Stormer viscometer, using a 500 gram weight.

A particular advantage of the products of my invention is that they may be used as casting resins as well as for glues. When the product is to be cast, it may be prepared by the addition of a suitable acid catalyst, stirred for a few minutes and poured into molds to cure at atmospheric pressure and at a low temperature as will be explained below in more detail.

The following examples are illustrative of the methods used in practicing my invention:

Example I

Eighty pounds of phenol, 120 pounds of 37% formaldehyde and 1200 cc. 30% caustic soda solution are charged into a steam-jacketed kettle equipped with a stirring device, a reflux condenser, a vacuum pump and a receiver. The batch is heated to reflux and allowed to remain at that temperature until one volume of resin solution when cooled to 70° F. will tolerate 2–3½ volumes of water, previously cooled to the same temperature. Approximately 30 minutes are required to complete this reaction at 100° C.

The batch is then cooled to 50° C. and 40 pounds of resorcinol and 240 cc. of 30% caustic soda solution are added to the batch. The charge is reheated to 80–90° C., and held within this range until the viscosity of the resin solution is "D" on a Gardner bubble-tube viscometer. This viscosity is equivalent to 1.0 poise. Vacuum is then applied, and distillation continued until a sample shows a viscosity of 120–140 at 70° F. on a Stormer viscometer using a 500 gram weight.

The finished resin solution will have a solids contents 65–67%, a pH of 8.0–8.3, and a specific gravity of approximately 1.20.

Example II

Eighty pounds of phenol, 138 pounds of 37% formaldehyde and 1212 cc. 30% caustic soda solution are charged into a steam-jacketed kettle equipped with a stirring device, a reflux condenser, a vacuum pump and a receiver. The batch is then heated to reflux and allowed to remain at that temperature until one volume of resin solution, when cooled to 70° F. will tolerate 2–3½ volumes of water, previously cooled to the same temperature. Approximately 30 minutes are required to complete this reaction at 100° C.

The batch is then cooled to 50° C. and 88 lbs. of resorcinol and 4000 cc. of 30% caustic soda solution are added to the batch. The charge is reheated to 80–90° C., and held within this range until a viscosity of "F" on a Gardner bubble-tube viscometer was obtained. This viscosity is equivalent to 1.4 poises. Vacuum is then applied and distillation continued until a sample shows a viscosity of 120–140 at 70° F.

The finished solution will have a solids content of 65–67%, a pH of 7.6–7.8 and a specific gravity of approximately 1.20.

When the resin is to be used for casting purposes it is advisable to omit the caustic soda solution normally added with the resorcinol. Eliminating the second caustic addition yields a solution which has a pH of 6.6–7.0. The stability of this solution is approximately the same as those having a pH of 7.6–8.3.

Example III

A batch of resin is prepared using the same proportions and procedure as used in Example I except that no caustic solution is added to the batch at the time the resorcinol is charged into the kettle.

The finished resin will have a viscosity of 120–140 at 70° F., a pH of 6.6–7.0 and a solids content of 65–67%.

Two pounds of the above resin is weighed in a mixing kettle and to it is added sufficient hypophosphorous acid (50%) to lower the pH of the solution to a pH of 2.0 (approximately 22 cc. of catalyst). The mix is agitated at slow speed for approximately 15 minutes at room temperature, and then allowed to stand for 30 minutes to allow the escape of trapped air. The solution is poured into an open mold, and cured at atmospheric pressure at a temperature of 140° F. After curing for approximately three hours at this temperature, the casting can be removed from the mold.

Resin solutions prepared by my invention having a pH as low as 6.0 or as high as 8.5 still have excellent stability upon storage at room temperature over a period of months. These products do not separate from solution on aging and can be diluted with large volumes of water without precipitating the resin solids.

Such products, when prepared with the proper viscosity, make excellent wood glues permitting assembly times of 1½ hours at 70° F. and 45 minutes at 90° F., i. e. after the hardening agent is added and the glue is spread. Formaldehyde or paraformaldehyde can be added as a hardening agent if the glue is to be cured at low temperatures while if higher temperatures are used for pressing, hexamethylenetetramine may also be used, as will be understood by those skilled in the art.

With low density woods such as spruce, poplar, basswood and Douglas fir, these glues can be cured at temperatures as low as 75° F., while with harder woods such as birch and maple, curing temperatures of at least 100° F. are preferred, although satisfactory products can be obtained even with such hard woods by curing at a temperature of 75° F.

The glues of my invention, particularly when catalyzed with hexamethylenetetramine, have the following desirable properties of a glue adaptable to molding methods in which intricate assemblies are made up and cured inside a flexible bag in a pressure tank; (a) ability to bond at low pressures, (b) ability to bond at low temperatures of the order of 200° F., (c) long assembly period without premature curing, (d) a high degree of slipperiness at curing temperatures and (e) ability to render the glues flexible and easy to form.

If desired, of course, these glues may also be used for hot pressing at temperatures well above 200° F.

By condensing the resin composition in accordance with this invention, several unusual properties can be secured in the glue. In particular, when the resin cures, it appears to go through two distinct gel periods. While the materials entering into the resin formulations should yield a homogeneous product, there is reason to believe that certain of the components may exist as separate species in the resin molecule. This co-existence of two species in one phase may allow one of the components to gel sooner than the second one. This gel which forms initially then dissolves in the substrate whereupon a further condensation occurs yielding a second gel.

The possibility of securing two separate gel phases in an adhesive allows the preparation of an unusual type of material for gluing operations. Whatever the explanation, the combination of resorcinol and phenol found in the resin as prepared following the practice of the invention leads to resins possessing superior characteristics.

The resin solutions of this invention are also well suited for making castings, such as the industrial castings used in the manufacture of metal forming dies. My products are distinctive from the ordinary phenolic casting resins in that they contain relatively high proportions of water (30 to 40%), are prepared with a relatively low mole ratio of formaldehyde, are relatively highly condensed and do not separate into layers when allowed to stand at room temperature for 48 hours or more. Accordingly, a plasticizer is not required although various well known fillers or extenders may be mixed into these resins for casting. Also, the castings prepared by my invention do not have to be case hardened by heating before being machined.

In preparing the resin solution for casting, it is acidified by addition of a suitable acid catalyst, agitated for 15–30 minutes or long enough to ensure a homogeneous solution, allowed to stand until air bubbles have escaped, and then poured into molds. The curing in the molds may take place at atmospheric pressure and at a suitable low temperature, such as 140° F. or lower.

The rate of cure of the resins after pouring depends upon various factors including the proportion of dihydric phenol in the product and the pH to which it is adjusted. For example, a resin formulated with 50 parts of resorcinol to 100 parts of phenol and catalyzed by addition of sufficient 50% hypophosphorous acid solution to lower its pH to 2.0 will gel in 1½ hours and become glass hard in 3½ hours at 140° F.

Strong mineral acids cannot be used as catalysts as the addition of a strong or highly ionized acid precipitates the resin from solution. Hypophosphorous acid is suitable if used in a fairly concentrated form such as a 40–50% solution. A 10–20% solution of this acid, however, is not satisfactory but causes precipitation. Various water soluble acids having an ionization constant not greater than $2.1 \times 10^{-4}$ can be used and monochloromonocarboxylic acids with an ionization constant not greater than $1.55 \times 10^{-3}$ are also satisfactory. Formic, acetic, lactic, monochloroacetic, and monochloropropionic acids are examples of suitable catalytic or hardening agents for this purpose.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. A water soluble resin composition produced by refluxing a mixture of one mol of phenol with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F. and refluxing the resulting product at a temperature not exceeding 100° C. with 10 to 150 parts of an unsubstituted mononuclear dihydric phenol for each 100 parts of said phenol until the condensation product has a viscosity of from 0.5 poise to 1.65 poises at a solids content between 40 and 60%.

2. A water soluble resin composition produced by refluxing a mixture of one mol of mononuclear phenols selected from the class consisting of phenol, cresols and xylenols with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F., at least 90% of said mononuclear phenols being phenol and refluxing the resulting product at a temperature not exceeding 100° C. with 10 to 150 parts of an unsubstituted mononuclear dihydric phenol for each 100 parts of said mononuclear phenols until the condensation product has a viscosity of from 0.5 poise to 1.65 poises at a solids content between 40 and 60%.

3. A water soluble resin composition produced by refluxing a mixture of one mol of phenol with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F. and refluxing the resulting product at a temperature not exceeding 100° C. with 10 to 150 parts of an unsubstituted mononuclear dihydric phenol for each 100 parts of said phenol until the condensation product has a viscosity of from 0.5 poise to 1.65 poises at a solids content between 40 and 60% and vacuum distilling the resulting product until the viscosity is 20 to 200 at 70° F. as determined by a Stormer viscometer using a 500 gram weight.

4. A water soluble resin composition produced by refluxing a mixture of one mol of phenol with 1.5 to 2 mols of formaldehyde in an aqueous solution containing 30 to 60% formaldheyde by weight at a pH of 7.5 to 8.8 in the presence of a non-volatile alkali catalyst until the reaction product contains less than .75% of free formaldehyde and tolerates the addition of from 0.1 to 5 volumes of water without causing the resulting solution to become cloudy at 70° F., adjusting the resulting product to a pH within the range of 7.0 to 9.0, and refluxing the resulting product at a temperature between 80 to 90° C. with 75 to 100 parts of an unsubstituted mononuclear dihydric phenol for each 100 parts of said phenol until the condensation product has a viscosity of from 0.5 poise to 1.65 poises at a solids content between 40 and 60%.

5. A water soluble resin composition produced by refluxing a mixture of one mol of phenol with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F. and refluxing the resulting product with 10 to 150 parts of resorcinol at a temperature not exceeding 100° C. for each 100 parts of said phenol until the condensation product has a viscosity of 0.5 poise to 1.65 poises at a solids content between 40 and 60%.

6. A water soluble resin composition produced by refluxing a mixture of one mol of phenol with 1.5 to 2.0 mols of formaldehyde in an aqueous solution containing 30 to 60% formaldehyde by weight at a pH of 7.5 to 8.8 in the presence of a non-volatile alkali catalyst until the reaction product contains less than .75% of free formaldehyde and tolerates the addition of from 0.1 to 5 volumes of water without causing the resulting solution to become cloudy at 70° F., adjusting the resulting product to a pH within the range of 7.0 to 9.0 and refluxing the resulting product at a temperature not exceeding 100° C. with 75 to 100 parts of resorcinol for each 100 parts of said phenol until the condensation product has a viscosity of from 0.5 poise to 1.65 poises at a solids content between 40 and 60%.

7. A method of producing a water soluble resin composition which comprises refluxing a mixture of one mol of phenol with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F. and refluxing at a temperature not exceeding 100° C. the resulting product with 10 to 150 parts of an unsubstituted mononuclear dihydric phenol for each 100 parts of said phenol until the condensation product has a viscosity of from 0.5 poise to 1.65 poises at a solids content between 40 and 60%.

8. A process of producing a water soluble resin composition which comprises refluxing a mixture of one mol of phenol with 1.3 to 2.5 mols of formaldehyde in an aqueous solution containing 30 to 60% formaldehyde by weight at a pH of 7.5 to 8.8 in the presence of a non-volatile alkali catalyst until the reaction product contains less than 2% of free formaldehyde and tolerates the addition of from 0.1 to 5 volumes of water without causing the resulting solution to become cloudy at 70° F., refluxing at a temperature not exceeding 100° C. the resulting product with 10 to 150 parts of an unsubstituted mononuclear dihydric phenol for each 100 parts of said phenol until the condensation product has a viscosity of from 0.5 poise to 1.65 poises at a solids content between 40 and 60%, and removing water from the product to obtain a viscosity of 20 to 200 at 70° F. as determined by a Stormer viscometer using a 500 gram weight.

9. The method of producing a water soluble resin composition which comprises refluxing a mixture of one mol of phenol with 1.5 to 2.0 mols of formaldehyde in an aqueous solution containing 30 to 60% formaldehyde by weight at a pH of 7.5 to 8.8 in the presence of a non-volatile alkali catalyst until the reaction product contains less than .75% of free formaldehyde and tolerates the addition of from 0.1 to 5 volumes of water without causing the resulting solution to become cloudy at 70° F., adjusting the resulting product to a pH within the range of 7.0 to 9.0 and refluxing at a temperature not exceeding 100° C. the resulting product with 75 to 100 parts of an unsubstituted mononuclear dihydric phenol for each 100 parts of said phenol until the condensation product has a viscosity of from 0.5 poise to 1.65 poises at a solids content between 40 and 60%.

10. A method of producing a water soluble resin composition which comprises refluxing a mixture of one mol of phenol with 1.3 to 2.5 mols of formaldehyde in an aqueous solution containing 30 to 60% formaldehyde by weight at a pH between 7.5 and 8.8 in the presence of a non-volatile alkali catalyst until the reaction product contains less than 2% of free formaldehyde and tolerates the addition of from 0.1 to 5 volumes of water without causing the resulting solution to become cloudy at 70° F. and refluxing at a temperature not exceeding 100° C. the resulting product with 10 to 150 parts of resorcinol for each 100 parts of phenol until the condensation product has a viscosity of from 0.5 poise to 1.65 poises at a solids content between 40 and 60%.

11. The method of producing a water soluble resin composition which comprises refluxing a mixture of one mol of phenol with 1.5 to 2 mols of formaldehyde in an aqueous solution containing 30 to 60% formaldehyde by weight at a pH between 7.5 and 8.8 in the presence of a non-volatile alkali catalyst until the reaction product contains less than .75% of free formaldehyde and tolerates the addition of from 0.1 to 5 volumes of water without causing the resulting solution to become cloudy at 70° F., adjusting the resulting product to a pH within the range of 7.0 to 9.0 and refluxing at a temperature not exceeding 100° C. the resulting product with 75 to 150 parts of resorcinol for each 100 parts of said phenol until the condensation product has a viscosity of from 0.5 poise to 1.65 poises at a solids content between 40 and 60%.

RAYMOND J. SPAHR.

REFERENCES CITED

The following references are of record in the file of this patent:

UNITED STATES PATENTS

| Number | Name | Date |
|---|---|---|
| 1,851,021 | Schuette | Mar. 29, 1932 |
| 2,150,698 | Nevin | Mar. 14, 1939 |
| 2,489,336 | Spahr et al. | Nov. 29, 1949 |